United States Patent [19]

Moore

[11] 4,010,733
[45] Mar. 8, 1977

[54] STRUCTURALLY INTEGRATED STEEL SOLAR COLLECTOR

[75] Inventor: Stanley W. Moore, Los Alamos, N. Mex.

[73] Assignee: The United States of America as represented by the United States Energy Research and Development Administration, Washington, D.C.

[22] Filed: June 3, 1975

[21] Appl. No.: 583,374

[52] U.S. Cl. .............................................. 126/271
[51] Int. Cl.² ........................................... F24J 3/02
[58] Field of Search .......... 126/270, 271; 237/1 A; 240/47; 52/171

[56] References Cited

UNITED STATES PATENTS

| | | | |
|---|---|---|---|
| 1,250,260 | 12/1917 | Wilcox | 126/271 |
| 3,089,480 | 5/1963 | Duncan | 126/270 |
| 3,145,707 | 8/1964 | Thomason | 126/271 |
| 3,156,234 | 11/1964 | Steinberg | 126/270 |
| 3,174,476 | 3/1965 | Steinberg | 126/270 |
| 3,268,720 | 8/1966 | Meckler | 240/47 |
| 3,270,739 | 9/1966 | Thomason | 126/271 |
| 3,886,998 | 6/1975 | Rowekamp | 237/1 A |
| 3,893,506 | 7/1975 | Laing | 237/1 A |
| 3,918,430 | 11/1975 | Stout et al. | 237/1 A |

*Primary Examiner*—Lloyd L. King
*Attorney, Agent, or Firm*—Dean E. Carlson; Jerome B. Rockwood

[57] ABSTRACT

Herein is disclosed a flat plate solar heat collector unit. The solar collector is integrated as a structural unit so that the collector also functions as the building roof. The functions of efficient heat collection, liquid coolant flow passages, roof structural support and building insulation are combined into one unit.

7 Claims, 6 Drawing Figures

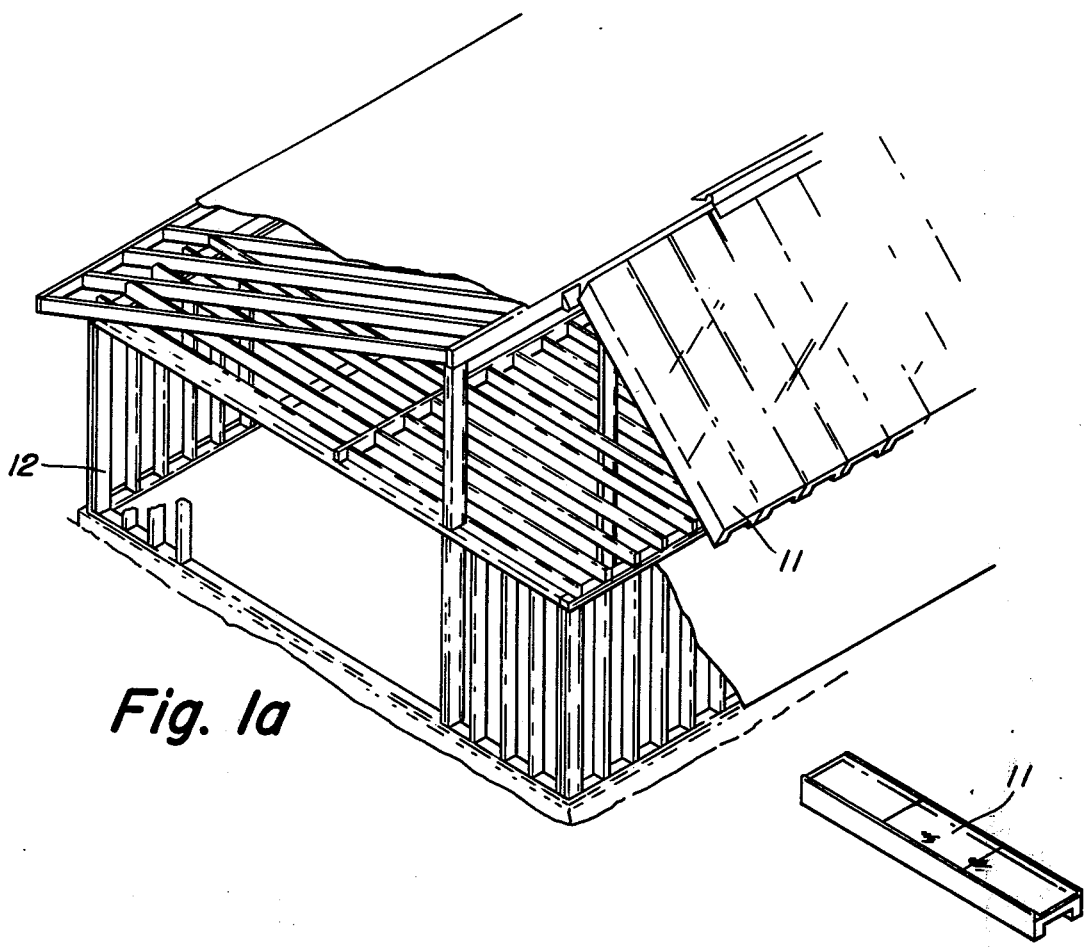
Fig. 1a
Fig. 1b
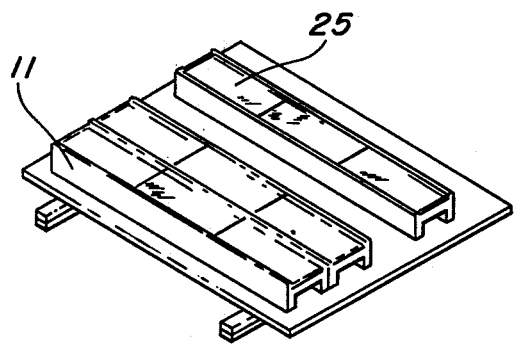
Fig. 1c

STRUCTURALLY INTEGRATED STEEL SOLAR COLLECTOR

BACKGROUND OF THE INVENTION

The solar energy incident upon the roof of a low-rise building in most of the United States is sufficient during the winter months to provide heating for the building and is more than sufficient during the summer months to power a cooling unit to maintain comfort. To utilize this energy requires that the sunshine be absorbed and converted to heat and that the heat be collected and stored for use during periods when the sun is not shining, as at night and during very cloudy weather.

Many methods for heat collection and storage have been proposed heretofore. Some of these methods utilize passive systems such as roof ponds which are suitable in low dew point, non-freezing climates. Other methods utilize air-cooled collectors and rock bin heat storage. Another system heretofore proposed employs a liquid cooled collector and a tank of water for heat storage.

The major impediment to widespread adoption of the liquid cooled collector type of solar heating and cooling in the U.S. is economic. Inexpensive, strong and durable materials must be used. Heretofore copper and aluminum have been employed. However these materials are too expensive and structurally weak. Other prior art devices have not been suitable for assembly line mass production and its attendant economics. Copper, aluminum and plastics have heretofore been employed in solar collectors. While some of these materials avoid corrosion problems they are relatively expensive and structurally weak, requiring reinforcement of the roof structure to accommodate collectors employing these materials.

SUMMARY OF THE INVENTION

The present invention comprehends the integration of a structural function into a solar collector. In addition to being self-supporting, it provides a portion of the building structure. Two thin steel sheets are welded together with peripheral seam welds and an array of sopt welds over the central portion, and expanded by compressed gas. The expanded plates form a flow network of parallel flat flow passages from one end to the other. The bottom collector plate edge portion is bent downward and formed into a structural channel, somewhat similar to a conventional steel C-beam. Similarly the top plate is bent upward providing means for connecting two adjacent collectors. In addition, insulation is placed about the bottom collector plate in the area between the two C-beams. Means are also provided for covering the collector surface with transparent material, such as glass.

BRIEF DESCRIPTION OF THE DRAWINGS

FIG. 1a illustrates a solar collector panel of the present invention in operative position on the roof of a building;

FIG. 1b illustrates one solar collector panel unit of the present invention;

FIG. 1c illustrates the method of shipping the solar collector units of the present invention prior to installation to form a solar collector panel.

DESCRIPTION OF THE PREFERRED EMBODIMENT

Referring now to FIG. 1a, a plurality of solar collector panel units 11 are illustrated mounted on the roof of a typical small building, such as a residence, 12. In a normal installation on a residence or small one-story commercial building, the required solar collector area is roughly one-third of the building floor area in most cases. As will be apparent, only a portion of the roof need comprise the solar collector panels 11. This portion of the roof preferably faces south.

A plurality of panel units 11, illustrated in FIG. 1c, are delivered to the construction site on a pallet. Since panel units 11 are self-supporting, shipment and storage in this manner enables convenience in assembly.

Figure 2:
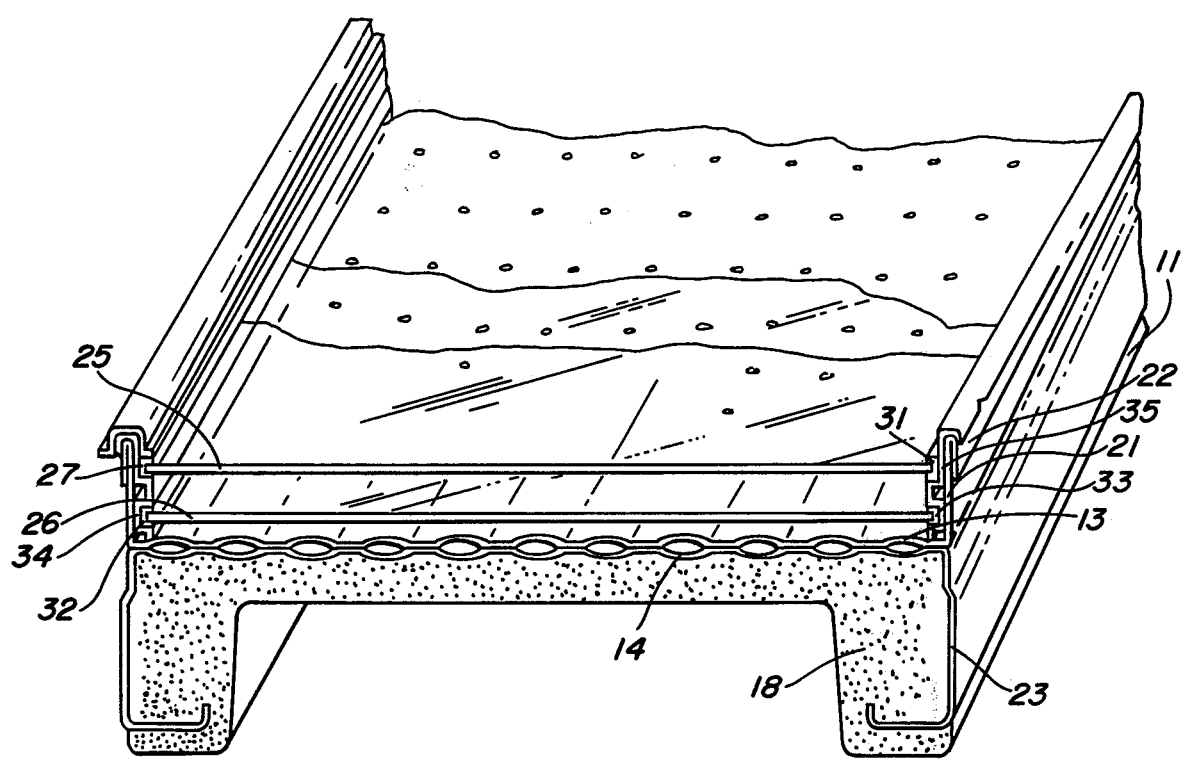
FIG. 2 is a cross section of a solar collector panel unit of the present invention.
Figure 3:
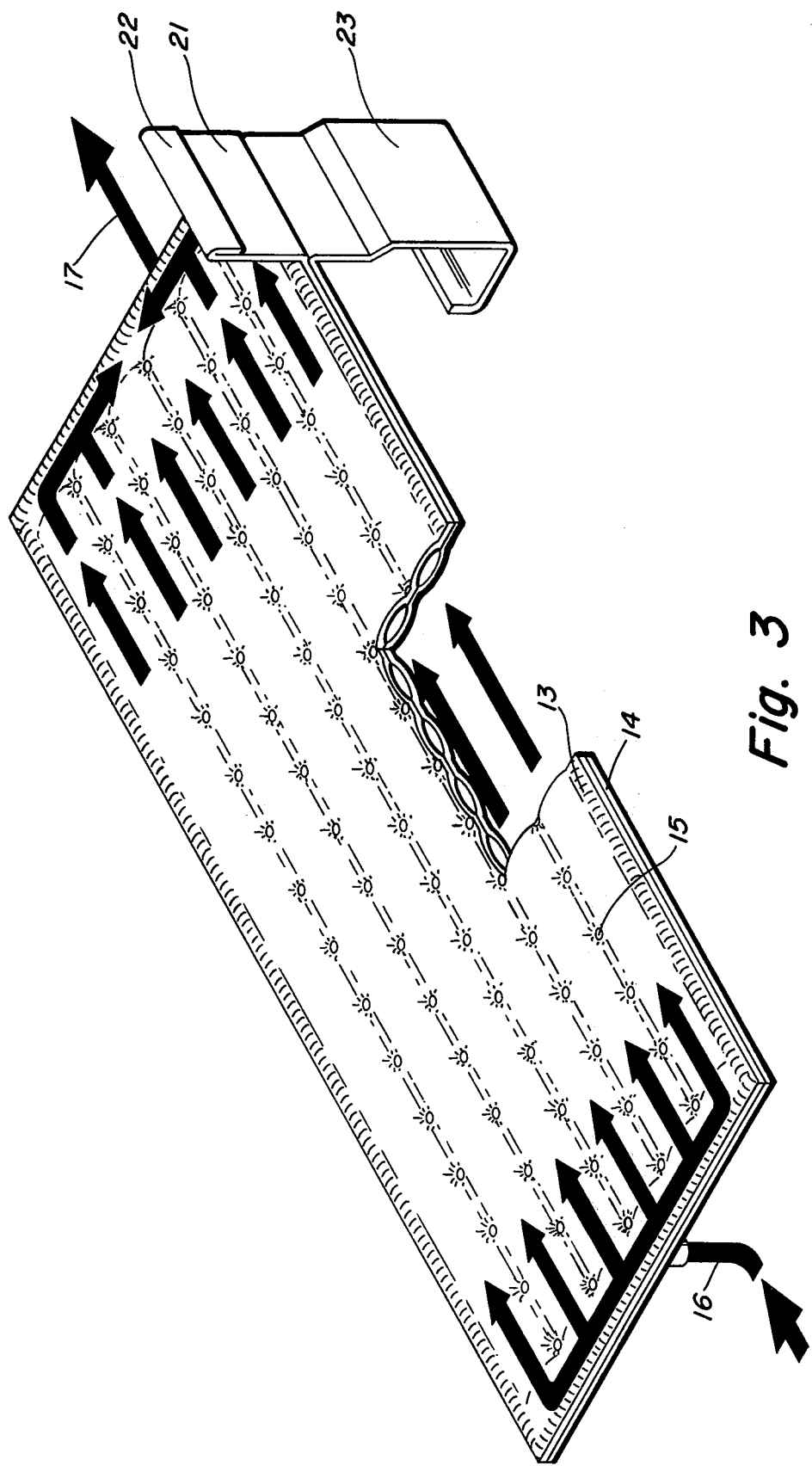
FIG. 3 illustrates fluid flow through a unit of the panel incorporating the present invention.

Referring now to FIGS. 2 and 3, a pair of rectangular steel plates 13 and 14 are seam welded around the periphery of the heat exchanger area. In addition, an array of intermittent spot welds 15 hold plates 13 and 14 together over the central portion of the heat exchanger area. Inlet pipe 16 and outlet pipe 17 are welded to suitable apertures in bottom plate 14 only. A compressed gas is introduced between upper plate 13 and lower plate 14 to force plates 13 and 14 apart where they are not welded together. As a result a flow network of parallel flat flow passages from one end to the other are formed. The resulting surface has a quilted appearance, and is coated with a suitable anti-corrosion protective coating. Sufficient steel is provided on either side of the steel plates 13 and 14 to form the integrated structural unit of the present invention. The sides of upper plate 13 are bent upward at either side to form a generally I-shaped flange structure 21. Additional strength is obtained by bending flange 21 back on itself to form a lip 22.

Lower unit section 14 is bent downward, transversely, and up, to form a C-shaped structural channel similar to that employed in a conventional steel C-beam. It will be apparent that the two steel plates 13 and 14, welded together form a structural unit, strong enough to provide a self-supporting roof structure. Thermal insulation 18, conveniently foam, is formed about the bottom of lower plate 14.

Efficiency of the collector is increased markedly by covering the collection surface with glass. Glass is opaque to reradiated infrared energy and thus traps reradiated energy, increasing heat collected by the panel. The air gas between the collector surface and the glass also serves to insulate the collector from the outside environment. Two panes of glass are a marked improvement over one in this regard. Therefore, means are provided for mounting two panes of glass, 25 and 26 on the collector unit of the present invention. Glass sheet 25 is retained by a pair of resilient strips 27 and 31. Glass sheet 26 is similarly retained by resilient strips 32 and 33. The resilient strips, fabricated of a suitable weather resistant rubber or plastic, having a substantially u-shaped cross section enclosing the edges of the glass sheets. The resilient strips are retained in proper relation to the heat exchanger surface by a pair of sheet metal retainer stampings 34 and 35.

Figure 4:
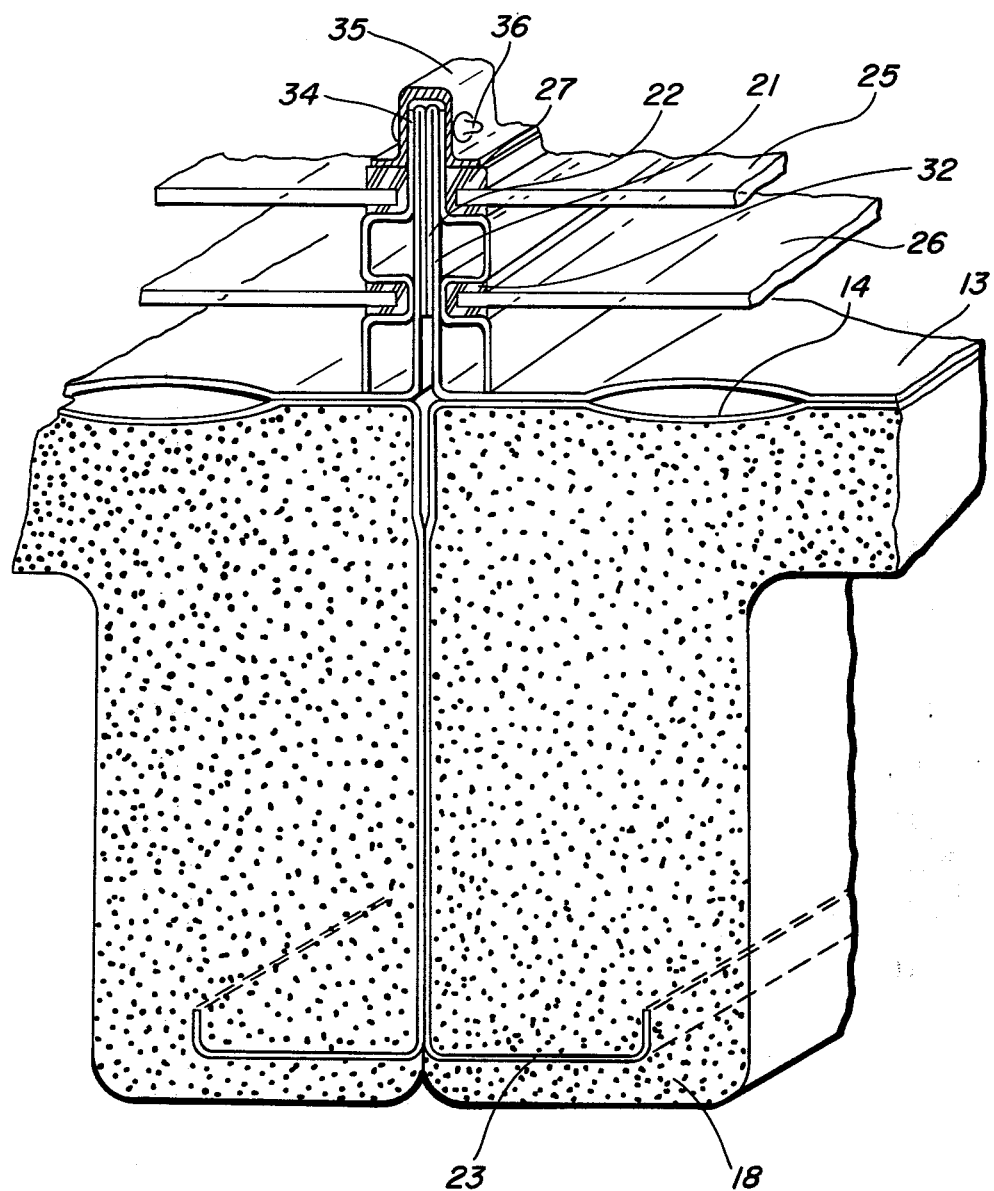
FIG. 4 is a cross section illustrating how adjacent solar collector units are connected.

As more clearly illustrated in FIG. 4, glass retainer 34 is placed in contact with the upstanding portions 21 on adjacent units. A cap strip 35 fastens adjacent elements of the two adjacent collector assemblies. A retaining fastener 36, passing through apertures in 27, 34 and 35, permanently secures the two adjacent collector assemblies and compresses elastic glass retaining strips 27 and 32.

In use the solar collector of the present invention would be filled with a suitable non-freezing heat exchanging liquid which is pumped through a heat exchanger wherein the collected heat is transferred to a suitable heat storage unit. The heat stored in the storage unit is then used for building heating and/or heating water. The collector units of the present invention can be readily mass produced and factory assembled, resulting in large cost savings over known collectors. The collector is completely self-supporting, providing a unitary roof structure. The collector surface thereby serves a structural function, as well s energy collection, thereby contributing to the overall section modulus of the roof. The collector glazing support means 27, 32 and 34 and the upper sheet 13 of the collector are integral, eliminating the possibility of leakage through the roof structure. Further, the foam insulation not only serves basic insulating function but increases panel rigidity to enhance the structural stability, and deadens sound.

It is to be understood that the invention is not limited to the specific features and embodiment hereinabove set forth, but may be carried on in other ways without departure from the spirit and scope of the invention as defined by the following claims.

What we claim is:
1. A solar energy collector unit comprising:
   an expanded metal energy collector panel including an upper sheet and a lower sheet;
   a substantially I-shaped upstanding portion at either side of said collector panel unitary with said upper sheet;
   a substantially C-shaped downwardly extending portion at either side of said collector panel unitary with said lower sheet;
   glazing support means adjacent each of said upstanding portion;
   a transparent panel covering said upper sheet secured by said glazing support means and,
   insulation covering the bottom of said lower sheet between said downwardly extending portions.
2. In the solar energy collector unit set forth in claim 1, connecting means for connecting two adjacent collector units.
3. In the solar energy collector unit set forth in claim 2, the periphery of said upper and lower sheets and a plurality of spots within said periphery are secured to one another.
4. In the solar energy collector unit set forth in claim 3, fastening means for securing two adjacent collector units to one another.
5. In the solar energy collector unit set forth in claim 4, said fastening means including an inverted U-shaped cap strip covering adjacent said I-shaped upstanding portions and said glazing support means, and fastening means for fastening said cap strip to said I-shaped upstanding portions.
6. In the solar energy collector unit set forth in claim 5, said insulation being foam formed in place between said downwardly extending portions.
7. A solar energy collector unit comprising:
   an expanded metal energy collector panel including an upper sheet and a lower sheet;
   a seam weld connecting said upper and lower sheets and defining a rectangular energy collecting area;
   a plurality of spaced spot welds within said rectangular energy collecting area, defining a plurality of fluid flow channels;
   fluid inflow means at one end of said rectangular energy collecting area, and fluid overflow means at the opposite end of said rectangular energy collecting area;
   an upstanding I-shaped member integral with said upper sheet on both longer sides of said rectangular energy collecting area;
   a downwardly extending C-shaped member integral with said lower sheet on both longer sides of said rectangular energy collecting;
   glazing means supported by said upstanding I-shaped members for covering said rectangular energy collecting area with a transparent sheet; and
   insulating means covering said lower sheet between said downwardly extending C-shaped members.

* * * * *